United States Patent
Hegde et al.

(10) Patent No.: US 8,532,435 B1
(45) Date of Patent: Sep. 10, 2013

(54) SYSTEM AND METHOD FOR AUTOMATICALLY ADAPTING IMAGES

(75) Inventors: Abhishek N. Hegde, Noida (IN); Herbert Wolfram, San Rafael, CA (US)

(73) Assignee: Adobe Systems Incorporated, San Jose, CA (US)

(*) Notice: Subject to any disclaimer, the term of this patent is extended or adjusted under 35 U.S.C. 154(b) by 473 days.

(21) Appl. No.: 12/542,979

(22) Filed: Aug. 18, 2009

(51) Int. Cl.
*G06T 3/40* (2006.01)

(52) U.S. Cl.
USPC ............ 382/298; 382/164; 382/173; 382/276

(58) Field of Classification Search
CPC ..... G06T 3/40; G06T 7/0081; H04N 7/26276
USPC ................ 382/164, 173, 243, 276, 298
See application file for complete search history.

(56) References Cited

U.S. PATENT DOCUMENTS

| | | | | |
|---|---|---|---|---|
| 6,345,279 B1* | 2/2002 | Li et al. | | 1/1 |
| 6,961,754 B2* | 11/2005 | Christopoulos et al. | | 709/204 |
| 7,051,040 B2* | 5/2006 | Easwar | | 1/1 |
| 7,574,653 B2* | 8/2009 | Croney et al. | | 715/249 |
| 7,860,309 B1* | 12/2010 | Bodnar et al. | | 382/173 |
| 8,238,662 B2* | 8/2012 | Banerjee et al. | | 382/181 |
| 2003/0110234 A1* | 6/2003 | Egli et al. | | 709/217 |
| 2006/0256130 A1* | 11/2006 | Gonzalez | | 345/619 |

* cited by examiner

*Primary Examiner* — Matthew Bella
*Assistant Examiner* — Jose M Torres
(74) *Attorney, Agent, or Firm* — Schwegman, Lundberg & Woessner, P.A.

(57) ABSTRACT

In various example embodiments, a system and associated method to automatically adapt images is provided. A request to render a stored image is received. The request comprises an output parameter indicative of a display constraint to be applied in the rendering of the stored image, while the stored image has region characteristics associated therewith. An adaptation process to apply to the stored image is determined using the output parameter. An output image is then rendered using the adaptation process and the region characteristics. The output image is then provided to a display device.

19 Claims, 9 Drawing Sheets

SYSTEM AND METHOD FOR AUTOMATICALLY ADAPTING IMAGES

TECHNICAL FIELD

The present application relates generally to the field of computer technology and, in a specific example embodiment, to a system and method for automatically adapting images.

BACKGROUND

Images may be resized in order to fit a display of a device. Often, images are created with an intention for the images to be displayed on a large display device such as a desktop monitor. In order to display the images on a smaller display device (e.g., a handheld device such as a mobile phone or personal digital assistant (PDA)), the image will need to be resized. Resizing typically includes reducing the image by shrinking the image down (e.g., to a thumbnail). The resized image may be so small that content of the image is no longer recognizable.

Alternatively, the image may be rendered in its original size on the smaller display device. However, display of this original size image on a small display device requires a user to scroll (horizontally and vertically) within a display screen area in order to ascertain the full image. Unfortunately, the user in this case can only view a portion of the original size image at any single time.

BRIEF DESCRIPTION OF DRAWINGS

Various ones of the appended drawings merely illustrate example embodiments of the present invention and cannot be considered as limiting its scope.

DETAILED DESCRIPTION

The description that follows includes illustrative systems, methods, techniques, instruction sequences, and computing machine program products that embody the present inventive subject matter. In the following description, for purposes of explanation, numerous specific details are set forth to provide an understanding of various embodiments of the inventive subject matter. It will be evident, however, to those skilled in the art that embodiments of the inventive subject matter may be practiced without these specific details. Further, well-known instruction instances, protocols, structures, and techniques have not been shown in detail.

Example embodiments provide a system and method for automatically adapting images to a variety of display devices (e.g., PDA, mobile phone, mobile Internet device (MID), monitor, television, etc.). These various display devices have different display areas. As such, example embodiments render images customized to requirements of each display device in a content-aware manner to emphasize important content of the images. In one embodiment, a request for a stored image is received. The stored image may be any visual content that can be displayed (e.g., photograph, PDF document, web page, small web format file, video) and may have region characteristics associated therewith. The request comprises at least an output parameter. An adaptation process to apply to the stored image based on the output parameter and the region characteristics are determined. An output image is then rendered using the adaptation process and provided to the display device.

In an alternative embodiment, a request for a stored image is received. The requested image is then returned to the display device. The display device may detect any associated regions of interest in the requested image, and scale the image based on an output parameter of the display device and a given context (e.g., viewing the image or displaying image as part of a web page, etc.).

Figure 1:
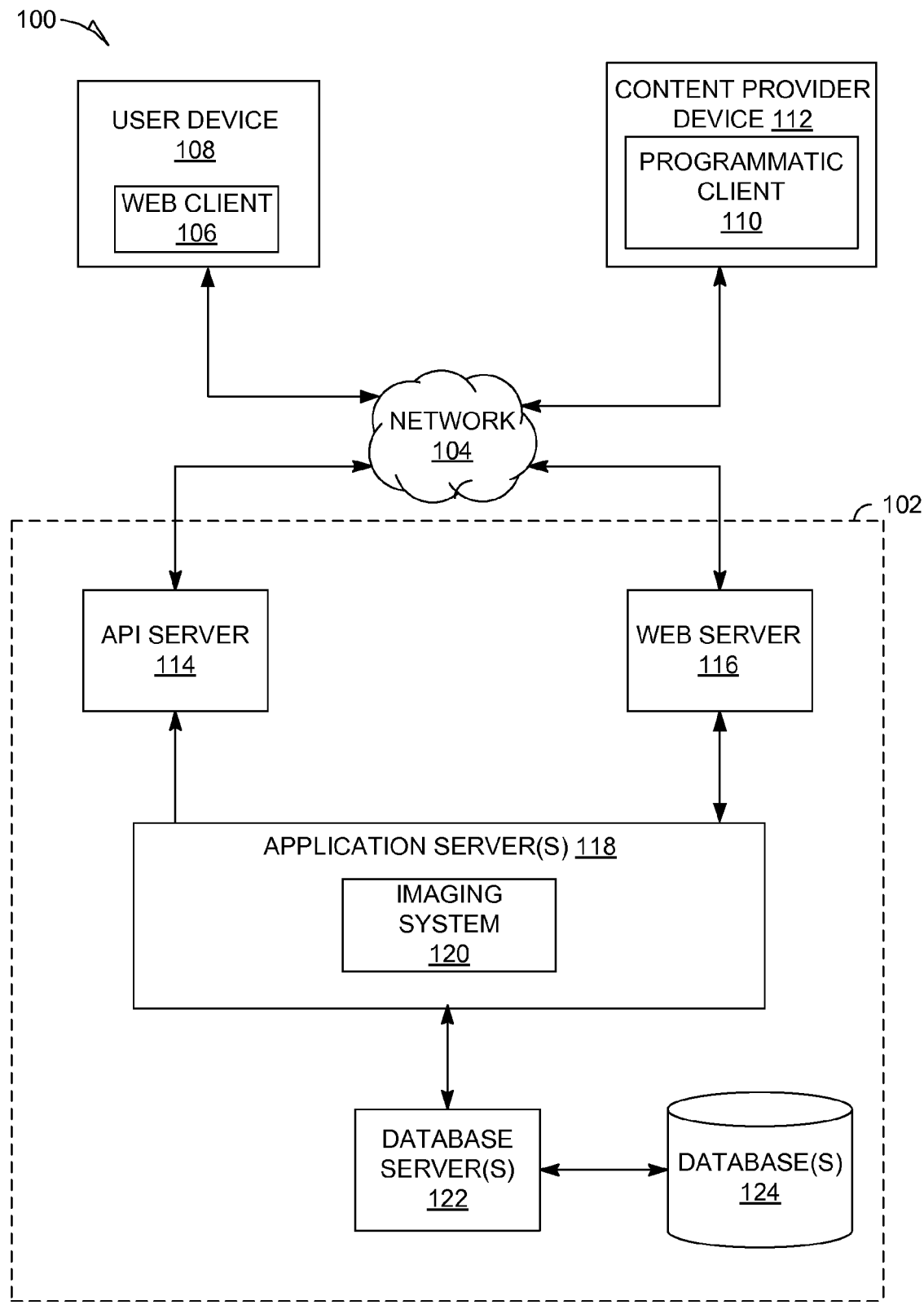
FIG. 1 is a block diagram illustrating an example embodiment of a high-level, client-server-based network architecture of a system used to provide automatic image adaptation.

With reference to FIG. 1, an example embodiment of a high-level client-server-based network architecture 100 for automatic image adaptation is shown. A networked system 102, in an example form of a network-server-side functionality, is coupled via a network 104 (e.g., the Internet or Wide Area Network (WAN)) to one or more clients. FIG. 1 illustrates, for example, a web client 106 operating via a browser (e.g., such as the Internet Explorer® browser) on a user device 108 (e.g., a display device). Additionally, a programmatic client 110 may execute on content provider device 112. It is noted that the user device 108 may include a programmatic client or the content provider device 112 may include a web client.

An Application Program Interface (API) server 114 and a web server 116 are coupled to, and provide programmatic and web interfaces respectively to, one or more application servers 118 at the networked system 102. The application servers 118 host an imaging system 120, which may comprise one or more modules, applications, or engines, each of which may be embodied as hardware, software, firmware, or any combination thereof. The application servers 118 are, in turn, coupled to one or more database servers 122 facilitating access to one or more database(s) 124.

The databases 124 store multiple images. For example, a user of the user device 108 may upload and store multiple images (e.g., photographs) to the database 124. In another example, the content provider device 112 may store images (e.g., images associated with a print or Internet advertisement) at the database 124.

The imaging system 120 provides a number of imaging functions and services to users that access the networked system 102. The imaging system 120 is discussed in more detail in connection with FIG. 2.

While the example architecture 100 of FIG. 1 employs a client-server architecture, a skilled artisan will recognize that the present disclosure is not limited to such an architecture. The example architecture 100 can equally well find application in, for example, a distributed or peer-to-peer architecture system. The imaging system 120 may also be implemented as standalone systems or standalone software programs operating under a separate hardware platform, which do not necessarily have networking capabilities. In one embodiment, the imaging system 120 may be located at the user device 108. In another embodiment, the imaging system 120 may be located at the content provider device 112.

Figure 2:
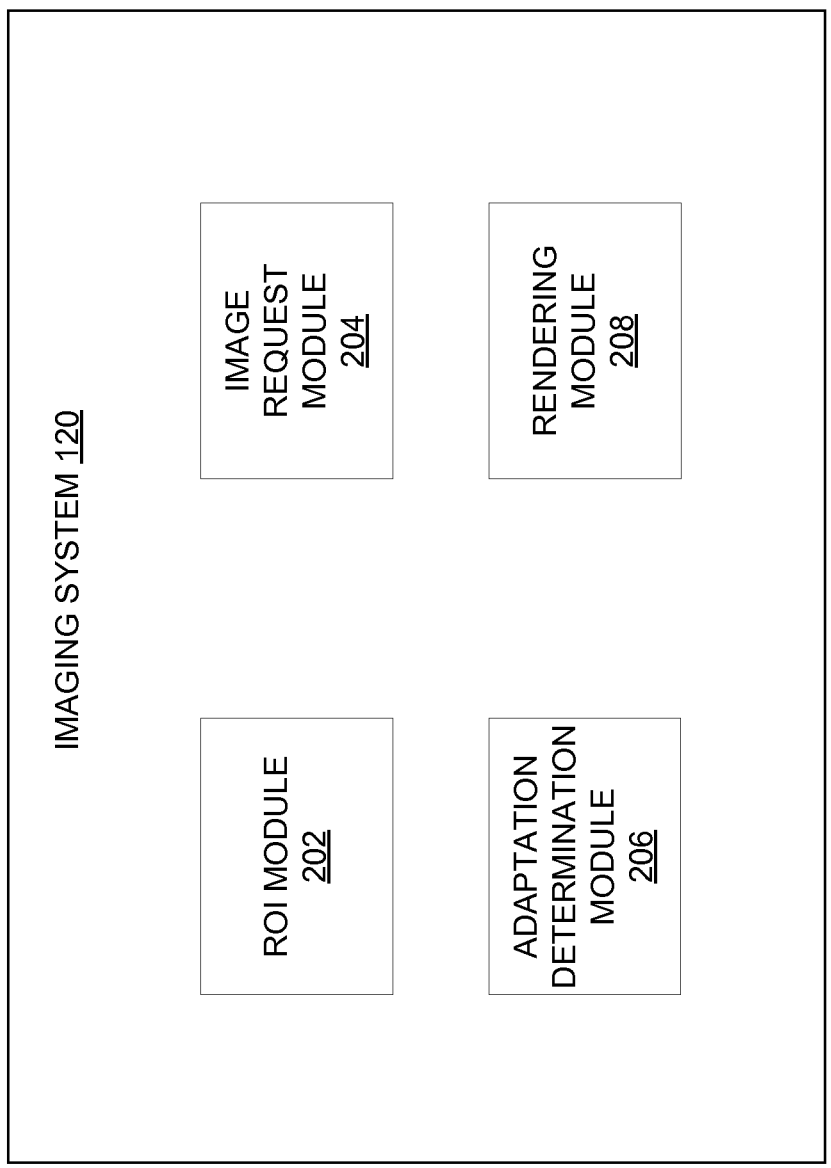
FIG. 2 is a block diagram illustrating an example embodiment of an imaging system of the network architecture of FIG. 1.

FIG. 2 is a block diagram illustrating an example embodiment of the imaging system 120 of the network architecture of FIG. 1. The imaging system 120 comprises a region of interest (ROI) module 202, an image request module 204, an adaptation determination module 206, and a rendering module 208. Alternative embodiments may comprise more, less, or functionally equivalent modules in various combinations. While certain modules or components are described as performing certain operations, these descriptions are merely examples and the operations may be performed by other components or systems The ROI module 202 identifies and/or defines one or more regions of interest associated with an image. The regions of interest include a core region of interest. Most images have at least one distinct region which contains an important or relevant feature that should be included when rendering the image to a lower resolution device. While an image may contain several regions that are important, an assumption may be made that a single core region of interest can be identified or implied. The core region of interest is an area of the image that is considered to be, for example, of particular interest to a particular person, group of people, or application, or potentially relevant to a specific context or event, and should be prioritized or preserved for display when rendering the image. Thus, when rendering on a display device, a rendering method is selected with the goal of preserving and rendering the core region of interest prominently. In some embodiments, a rendering method which preserves the entire core region of interest is selected. For example, a core region of interest of a full-body portrait may be a face, while a core region of interest of a team photo may be a star player.

In some embodiments, the core region of interest may be automatically determined. In one embodiment, face recognition technology is used to identify a face within an image and the face will be designated as the core region of interest. Alternatively, other image recognition technologies (e.g., pattern matching technologies or feature recognition technologies) that can make assertions as to what is important in an image for a particular application may be used. For example, if a shoe vendor has images including models wearing shoes, the important region of interest is the shoes. As such, some intelligence is provided on the image recognition technology. In the shoe example, the intelligence will recognize that a face is at an opposite end of a body from the shoes and selects an area around the shoes as the core region of interest. Furthermore, a combination of different recognition technologies may be utilized in order to maximize a probability of a good initial match for a core region of interest.

In some embodiments, user input or guidance may be provided in order to define the core region of interest. For example, if more than one person is in an image and a face recognition technology is applied, a user can provide some guidance in order to select an area around one or more faces that will comprise the core region of interest. Thus, the ROI module 202 provides an assumed core region of interest, and the user provides guidance such as correcting, moving, or resizing this assumed core region of interest.

In other embodiments, a user may manually indicate a core region of interest. For example, a user may select an area of an image using a selection device (e.g., a cursor) by drawing a box around the core region of interest. In one embodiment, a lasso tool may be used to select the core region of interest. In another embodiment, a single point input may be used to indicate a core region of interest (e.g., user clicks on a center of a person's face). It is noted that the selected area may be any shape including, for example, rectangular, elliptical, or circular shapes. The selection is then received by the ROI module 202.

The region of interest may also include one or more secondary regions of interest. In example embodiments, the secondary regions of interest expand out from the core region of interest. For example, the secondary regions of interest may be a set of concentric, increasing rectangles or other shapes surrounding the core region of interest with the full image as the outermost shape. It should be noted that the secondary regions of interest do not need to be concentric around the core region of interest, or that the core region of interest be centered in the secondary regions of interest (e.g., the core region of interest may be offset in one or more secondary regions of interest). Continuing with the shoe vendor example, the core region of interested is the shoes. However, a secondary region of interest may be a face of the model. Thus, depending on the display device, the shoes will be preserved, while the face may be shown if there is room on a display of the display device.

In various embodiments, the one or more secondary regions of interest may be automatically determined by the ROI module 202. In other embodiments, user inputs indicating the secondary regions of interest may be received by the ROI module 202 either as guidance in automated recognition technologies or as a manual input.

Determining the regions of interest includes mapping the regions of interest to the image. Mapping comprises determining a region size and position for each region of interest (collectively referred to as "region characteristics"). These region characteristics are saved with the image. In one embodiment, the region characteristics may be saved as embedded metadata of the image. Alternatively, the region characteristics may be stored in other forms or locations and associated with the image. In another embodiment, the region characteristics may be determined on demand/on-the-fly in response to a request for an image.

The image request module 204 exchanges information with various user devices. In example embodiments, the image request module 204 receives a request for adaptation of one or more images for display. The request may be received from a client device (e.g., user device 108) of a user or a content provider (e.g., via the content provider device 112). The image request module 204 further provides one or more rendered output images in response to the request.

The adaption determination module 206 dynamically determines an adaptation process to apply to the image. The adaptation process may comprise cropping to a region of interest, scaling the image, or a combination of both. In example embodiments, the adaption determination module 206 will determine how to adapt the image based on the parameters determined from the request and parameters associated with the image (e.g., region characteristics). In other embodiments, an application requesting the image will indicate how to adapt the image. Examples of adaptation determination will be discussed in more detail in connection with FIG. 5 and FIG. 6.

The rendering module 208 utilizes the adaptation process to render the output image. The resulting output image may be scaled, cropped to a core region of interest, cropped to a secondary region of interest, or any combination of these.

Figure 3:
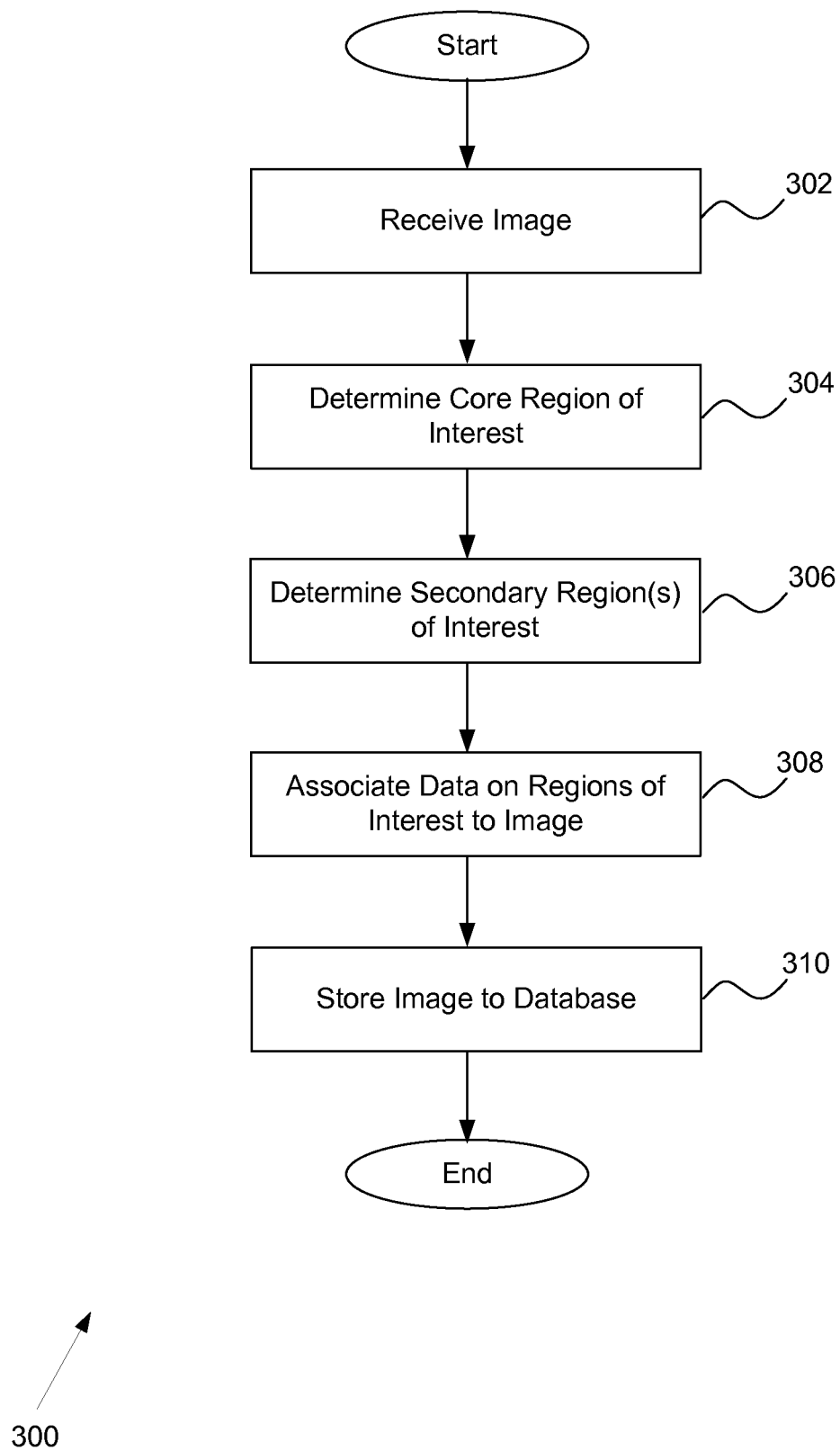
FIG. 3 is a flowchart illustrating an example method for determining regions of interests for an image.

FIG. 3 is a flowchart illustrating an example method 300 for determining regions of interest for an image. In example embodiments, the regions of interest are determined using a ROI module (e.g., the ROI module 202). At operation 302, an image to be processed is received. For example, a user may upload one or more images to a networked system (e.g., networked system 102).

A core region of interest is determined at operation 304. In some embodiments, the core region of interest may be automatically determined by the ROI module. In one embodiment, face recognition is used to identify a face within an image. Alternatively, other image recognition technologies (e.g., pattern matching technologies or feature recognition technologies) that can make assertions as to what is important in an image for a particular application may be used. In a further example embodiment, user-provided "tagging" within an image may be used to determine a region of interest. Furthermore, a combination of different recognition technologies may be utilized in order to maximize a probability of a good initial match for a core region of interest.

The automated recognition technology may be augmented with user input. For example, the ROI module provides an assumed core region of interest, and the user corrects, moves, or resizes the core region of interest. In alternative embodiments, a user may manually indicate a core region of interest. Region characteristics (e.g., size and location) are determined for the core region of interest and associated with the image (e.g., saved as metadata with the image). It is noted that different core regions of interest may be determined for different applications for the same image.

At operation 306, one or more secondary regions of interest are determined. One or more secondary regions of interest may be automatically determined by the ROI module, be entirely user inputted, or be a combination of automated recognition technology and user guidance. In example embodiments, the secondary regions of interest expand out from the core region of interest. For example, the secondary regions of interest may be a set of concentric, increasing rectangles or other shapes surrounding the core region of interest with the full image as the outermost shape. Region characteristics (e.g., size and location) are determined for the one or more secondary regions of interest and associated with the image (e.g., saved as metadata with the image). It is noted that different secondary regions of interest may be determined for different applications for the same image. In some embodiments, secondary regions of interest may be not be used and operation 306 is not required.

After the regions of interest are determined and mapped to the image, region sizes and positions (region characteristics) are saved to the image at operation 308. In one embodiment, the region characteristics are saved as embedded metadata of the image. Alternatively, the region characteristics may be stored in other forms of data storage. The image is then stored to a database (e.g., database 124 or database associated with the user device) at operation 310.

Figure 4:
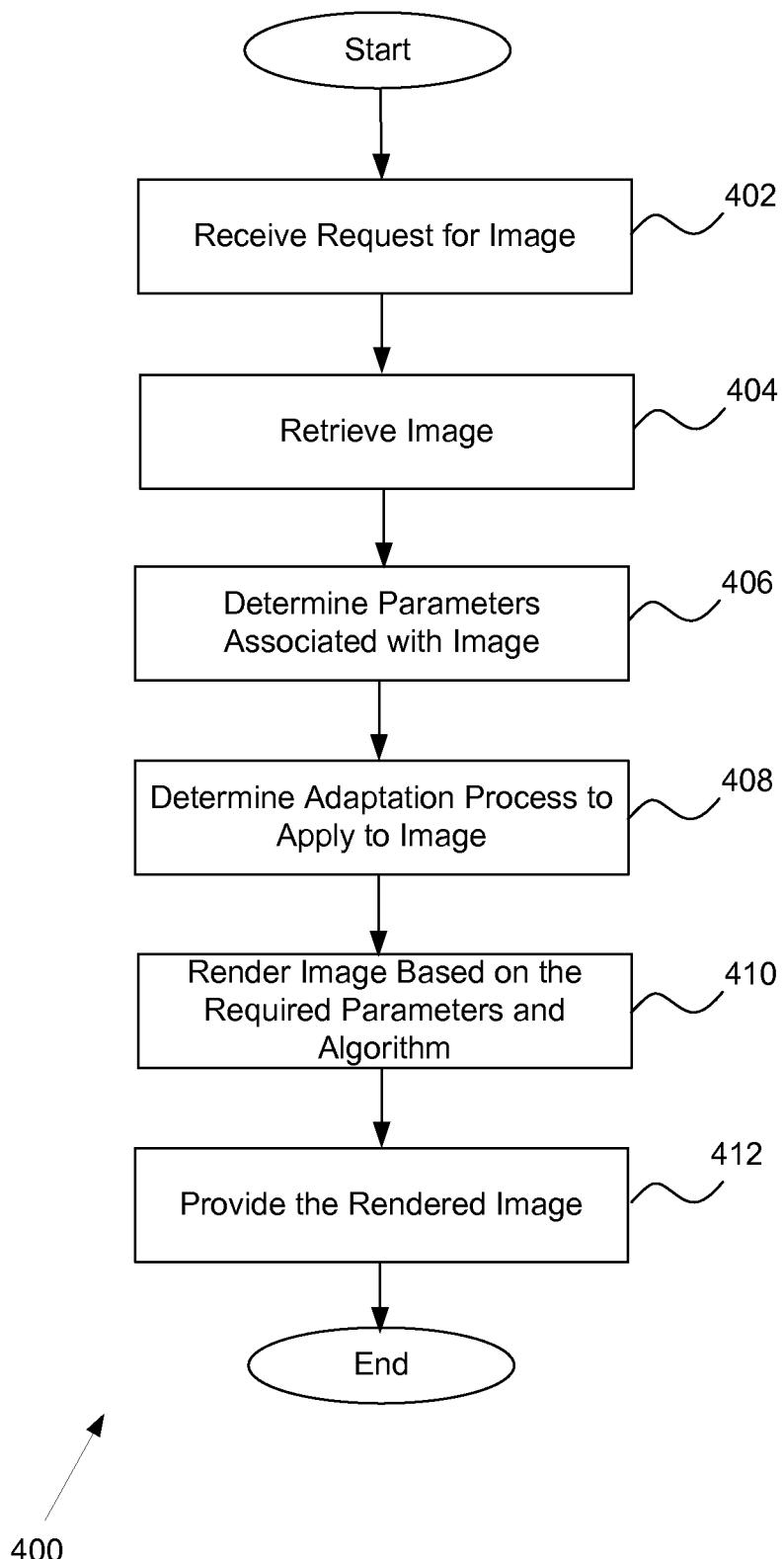
FIG. 4 is a flowchart illustrating an example method for automatically adapting an image.

FIG. 4 is a flowchart illustrating an example method 400 for automatically adapting an image. At operation 402, a request for an image is received (e.g., by an image request module 204). For example, a user on a handheld device may request an image stored in the database associated with the networked system. In another example, the user may be requesting a web page or an advertisement from a content provider. In this example, an HTML page contains a reference to a location on the networked system (e.g., URL) which is a request for an image.

The image is then retrieved at operation 404. In some embodiments, the image is stored at a database (e.g., database 124) associated with the imaging system (e.g., imaging system 120). Thus, an image request module may retrieve the image from the database. In other embodiments, the image may be received with the request. For example, the client device may request display of an image locally stored on the client device, but which requires resizing.

At operation 406, parameters for rendering the image are determined. For embodiments where the requesting client device, itself, is sending the request, the request will contain an output parameter associated with display requirements, characteristics, and/or capabilities of the client device (e.g., a size in width and height of a display area where the rendered (output) image will be displayed). For example, the request may indicate that the resolution of a display of the client device is a 200×200 pixel size. It should be noted that requests from devices with different display attributes may have different output parameters. For example, a device with a constrained display may have a 200×200 pixel size, whereas if the associated display device is a 52" television, the output parameters may be 800×800 pixel size. In embodiments where a content provider device sends the request, an HTML page will have a reference that includes an image size available for the output image. So when the page is instantiated, a layout knows the resolution is a 200×200 pixel size (e.g., a browser is aware of this size or resolution restriction). The browser can append this output parameter (e.g., resolution) to the request. It is noted that sizing is not limited to pixel dimensions and other forms of measurements may be utilized (e.g., inches, millimeters, or other forms of normalized coordinate space).

The parameters determined in operation 406 may also include data regarding a size (e.g., width and height) of the input image, the core region of interest, and optional secondary regions of interest. Additionally, adaptation determination may utilize application-specific parameters and thresholds. For example, the application-specific parameter may emphasize foreground versus background content in an image or provide a maximum and minimum threshold associated with the application.

At operation 408, a determination is made as to how to adapt the image for output (e.g., adaptation process). In example embodiments, an adaption determination module (e.g., adaptation determination module 206) can determine an optimal manner to adapt the image based on various parameters associated with the request and the image. In alternative embodiments, an application or device requesting the image will indicate an adaptation process to apply (e.g., render image using a core region of interest) to the adaptation determination module.

An output image is then rendered based on the determined parameters and the determined adaptation process at operation 410. Various examples of application of the determined parameters and determination of the adaptation to be applied are discussed in more detail in connection with FIG. 5 and FIG. 6. The (rendered) output image is then provided to the display device at operation 412.

Figure 5:
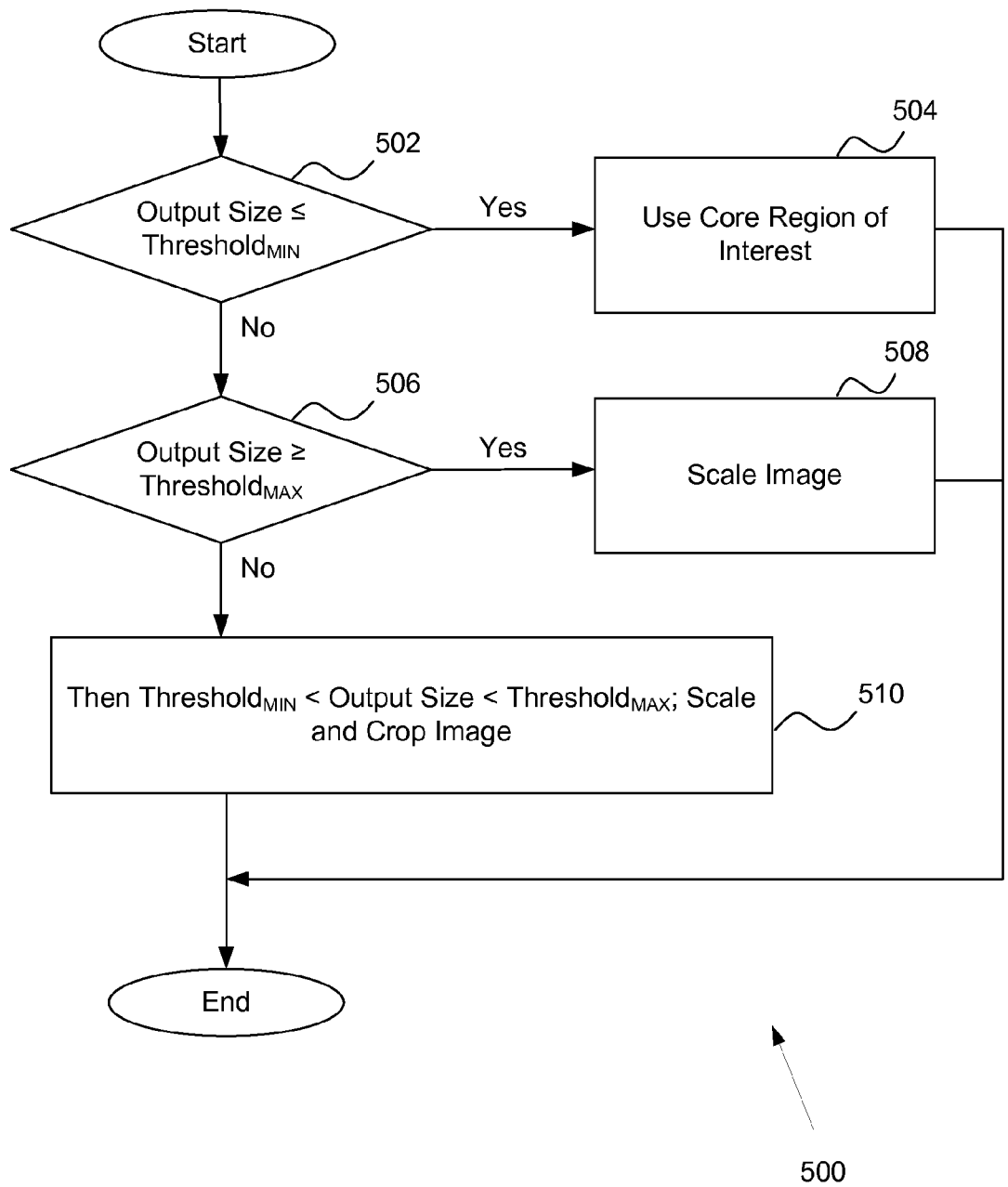
FIG. 5 is a flowchart illustrating one example method for rendering the image.

FIG. 5 is a flowchart illustrating one example method 500 for determining an adaptation process (e.g., operation 408). The method 500 assumes as constraints that a calculated crop rectangle (which when applied will result in a rendered image that can be scaled directly to an output image size to produce the output image) will have the same aspect ratio as the output image size, will cover at least the core region of interest, and will not extend outside the input image. The method 500 applies continuously variable cropping to reduce an amount of scaling necessary to fit the input image into the output image size.

As previously discussed, various parameters and characteristics associated with the image are determined (e.g., operation 406). Some of the parameters are received with the request. In one embodiment, these parameters may comprise application-specific parameters associated with a minimum output size threshold and a maximum output size threshold as well as an output image size associated with the display device. Additionally, data (e.g., metadata) associated with the input image may provide parameters such as the input size of the image and region characteristics representing one or more regions of interest data. The region characteristics may comprise a size of the regions of interest and location of the regions of interest in the image (e.g., core region of interest offset).

At operation 502, a determination is made as to whether the output image size is greater than or equal to the minimum output size threshold. If the output size is less than or equal to the minimum output size threshold, the input image is cropped to render the output image with the correct output size at operation 504. Cropping, in this embodiment, results in a full cropping to a core region of interest. The condition of operation 502 may hold true in, for example, embodiments where the image is to be displayed in a low resolution device display size (e.g., 150×150 pixel resolution).

However, if the condition of operation 502 is not true, then a further determination is performed at operation 506 to determine if the output image size is greater than or equal to the maximum output size threshold. If operation 506 is true, than the image is scaled at operation 508. The condition of operation 506 may hold true in, for example, embodiments using a typical full-resolution browser (e.g., having 800×800 pixel resolution).

If the condition of operation 506 is not true, then the output size is between the minimum and maximum output size threshold. As a result, the input image is both scaled and cropped at operation 510. More cropping is applied the closer the output size is to the minimum threshold, while more scaling is applied the closer the output size is to the maximum threshold. In one embodiment, operation 510 may be mathematically represented by the following equations. First, a ratio r is determined which indicates where the output size is between the minimum threshold and the maximum threshold. The ratio r may be represented as for example:

$$r = \frac{(\text{output size} - \text{minimum threshold})}{(\text{maximum threshold} - \text{minimum threshold})} \quad (1)$$

Next, a crop size is determined using the ratio r. The crop size may be determined, for example as, $$\text{crop size} = \text{CROI} + r*(\text{input size} - \text{CROI}), \quad (2)$$

where CROI is the core region of interest size.
A crop offset is then determined, which may be represented as, $$\text{crop offset} = \text{CROI offset} + r*(0 - \text{CROI offset}). \quad (3)$$

While the example of FIG. 5 illustrated rendering using only a core region of interest, alternative embodiments may, in addition, utilize one or more secondary regions of interest.

Figure 6:
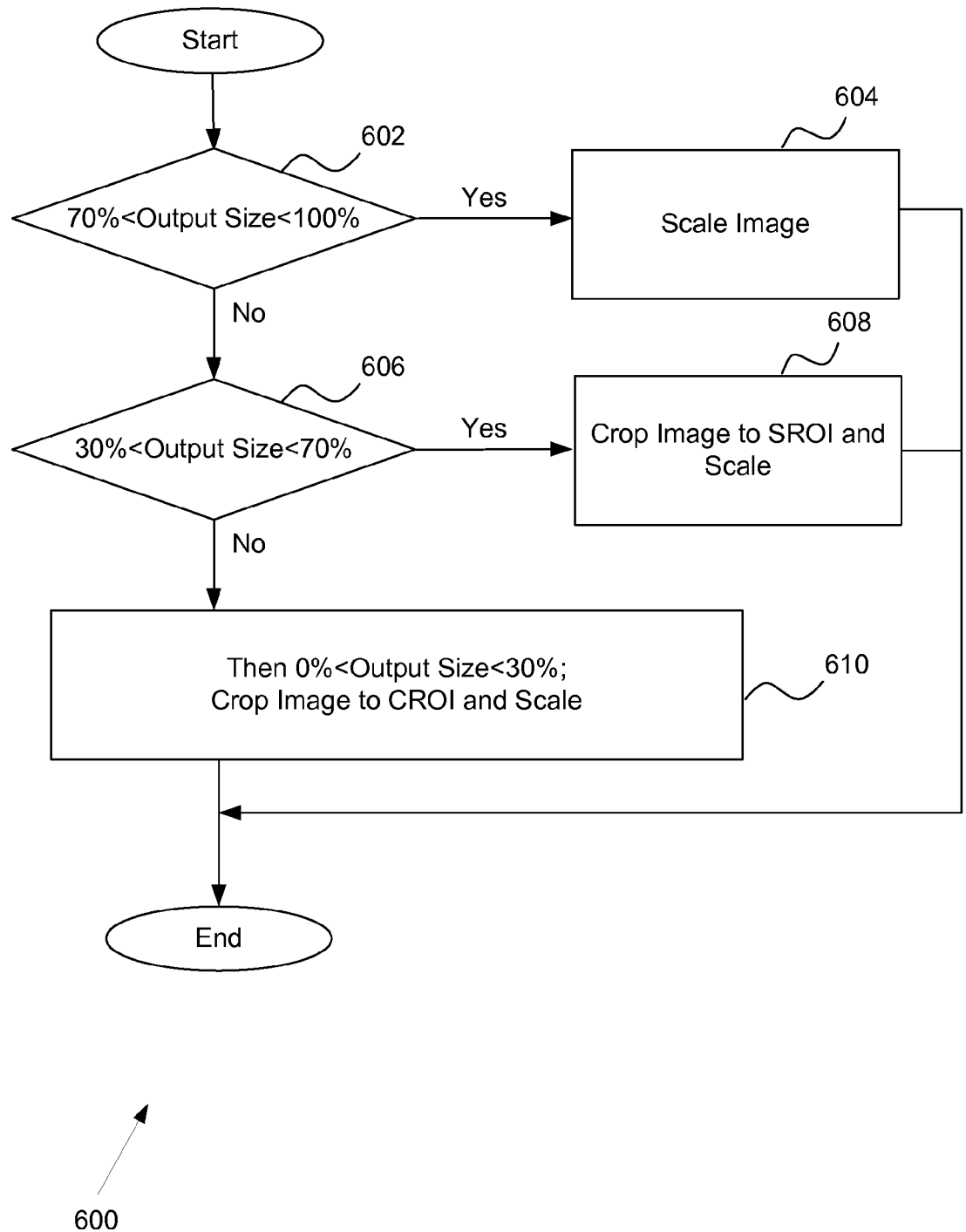
FIG. 6 is a flowchart illustrating another example method for rendering the image.

FIG. 6 is a flowchart illustrating another example method 600 for determining an adaptation process (e.g., operation 408). In this method 600, the adaptation process determination is based on preset percentages, which may be user or application defined. The example of FIG. 6 illustrates use of secondary regions of interest to control an amount of scaling necessary to fit the input image to the desired output image.

A determination is made at operation 602 as to whether the output size is between 70% and 100% of the input size. If operation 602 is true, then the input image is scaled, accordingly, to fit the output size at operation 604.

However, if operation 602 is false, then a further determination is made as to whether the output size is between 30% and 70% of the input size at operation 606. If operation 606 is true, then the rendering module renders a secondary region of interest assigned for that particular output size at operation 608. The image may also be scaled accordingly to fit the output size. In example embodiments, this is a two stage process whereby the secondary region of interest is first rendered and then scaled to fit the output size.

If operation 606 is false, the output size is between 0% and 30% of the input size. In this situation, the rendering module renders a core region of interest at operation 610. The image may also be scaled in a two stage process similar to operation 608 whereby the core region of interest is rendered and then scaled to fit the output size.

It should be noted that the percentages used in the method 600 of FIG. 6 are merely examples. Alternative embodiments may utilize other percentages. These percentages may be user-defined or application-specific. Additionally, more than one secondary region of interest may be associated with an image, thus resulting in further percentage breakdowns.

It is appreciated that the methods of FIG. 3-FIG. 6 are example. Alternative embodiments may comprise more, less, or functionally equivalent steps. Additionally, the steps of the various methods may be practiced in a different order. For example, the method 500 may utilize secondary regions of interest instead of or in addition to the core region of interest. Furthermore, more than one secondary region of interest may be defined for an image. In these cases, more thresholds and percentages may be utilized to define more cropping and scaling options and thus resulting in more determinations (e.g., operations 502, 504, 602, and 604) being performed.

Figure 7A:
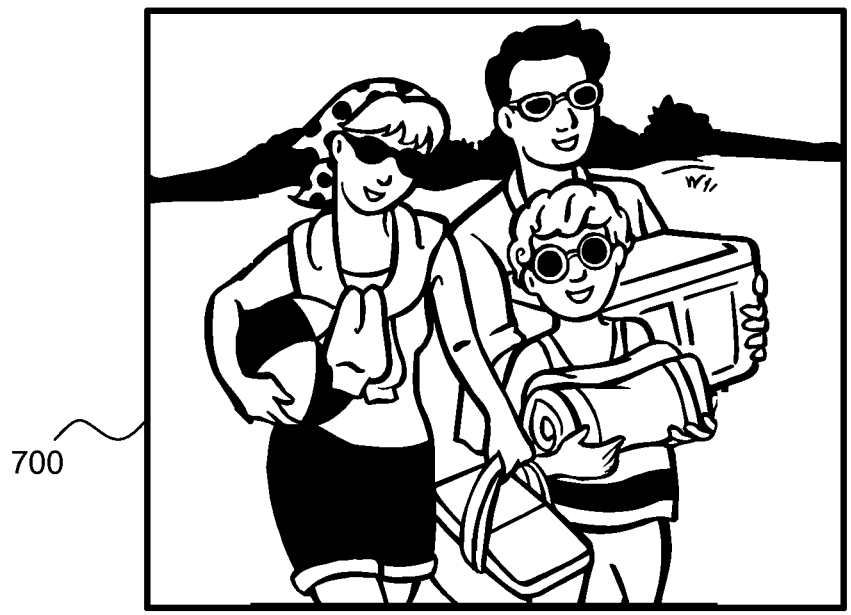
FIG. 7a-FIG. 7d illustrate examples for determining and displaying a core region of interest and a secondary region of interest.
Figure 7B:
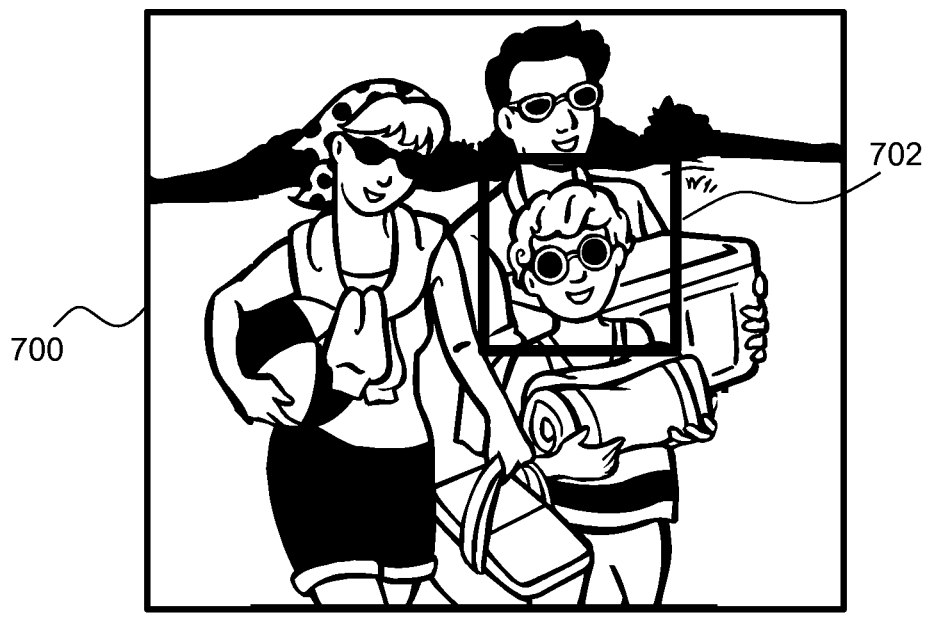

FIG. 7a-FIG. 7d illustrates examples for determining and displaying a core region of interest and a secondary region of interest. FIG. 7a shows an original image 700. Using a selection device, a core region of interest 702 may be defined around a portion of the image 700 as shown in FIG. 7b. The selection device may be a recognition technology (e.g., face recognition technology) or a user input device (e.g., user controlled mouse). The core region of interest may be determined using a combination of automated recognition and user input. For example, FIG. 7b contains three individuals. As such, face recognition technology will need some guidance from the user as to which face to select as the core region of interest.

Figure 7C:
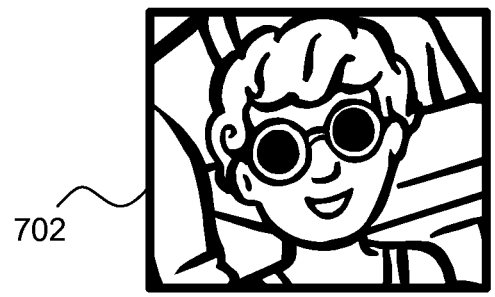

In this example, the core region of interest 702 is around a face of a child in the image 700. While the core region of interest 702 is shown as being a square, any shape may be used to define the core region of interest 702. When a display device has a low resolution (or other low display screen parameters), the core region of interest 702 may be the only portion of the original image 700 that will be rendered and displayed. FIG. 7c illustrates the core region of interest 702.

Figure 7D:
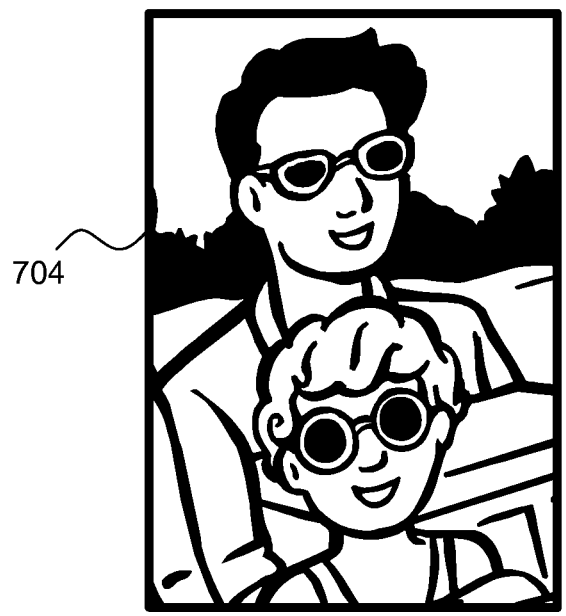

The core region of interest 702 may be complemented by one or more secondary regions of interest. This secondary region of interest may surround the core region of interest 702. As shown in FIG. 7d, a secondary region of interest 704 includes the child and a father. The determination of the secondary region of interest 704 may be automatic, manual, or a combination of both. For example, recognition technology may select a secondary region of interest and a user provides guidance input. The guidance input may include resizing, moving, or selecting the secondary region of interest. As is illustrated, the secondary region of interest is not concentric around the core region of interest but offset to include the father.

Modules, Components, and Logic

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in the dedicated and permanently configured circuitry or in temporarily configured circuitry (e.g., configured by software) may be driven by, for example, cost, time, energy-usage, and package size considerations.

Accordingly, the term module should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Example Machine Architecture and Machine-Readable Medium

Figure 8:
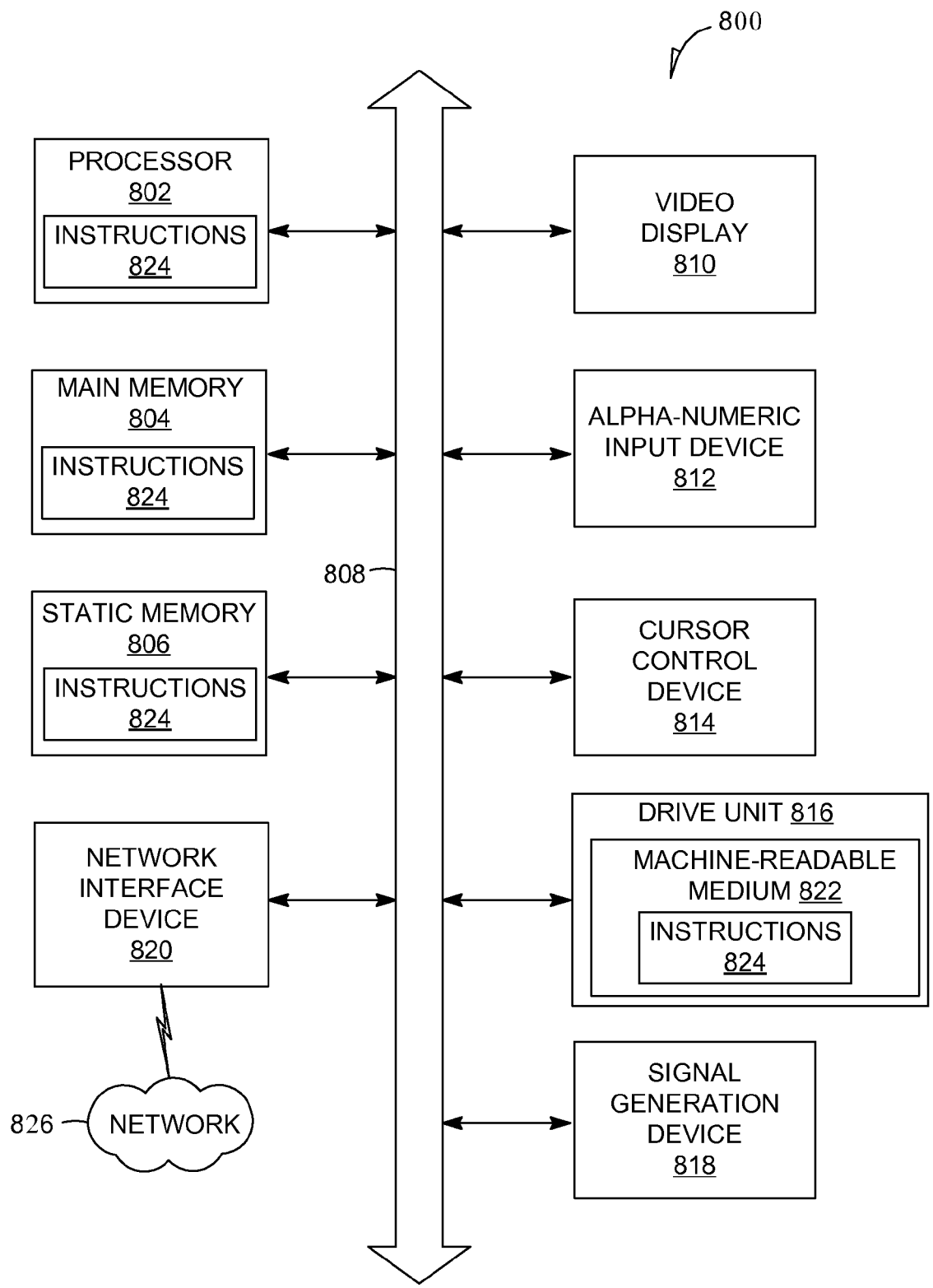
FIG. 8 is a simplified block diagram of a machine in an example form of a computing system within which a set of instructions for causing the machine to perform any one or more of the methodologies discussed herein may be executed.

With reference to FIG. 8, an example embodiment extends to a machine in the example form of a computer system 800 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 may include a processor 802 (e.g., a central processing unit (CPU), a graphics processing unit (GPU) or both), a main memory 804 and a static memory 806, which communicate with each other via a bus 808. The computer system 800 may further include a video display unit 810 (e.g., a liquid crystal display (LCD) or a cathode ray tube (CRT)). In example embodiments, the computer system 800 also includes one or more of an alpha-numeric input device 812 (e.g., a keyboard), a user interface (UI) navigation device or cursor control device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of instructions 824 and data structures (e.g., software instructions) embodying or used by any one or more of the methodologies or functions described herein. The instructions 824 may also reside, completely or at least partially, within the main memory 804 or within the processor 802 during execution thereof by the computer system 800, the main memory 804 and the processor 802 also constituting machine-readable media.

While the machine-readable medium 822 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

Transmission Medium

The instructions 824 may further be transmitted or received over a communications network 826 using a transmission medium via the network interface device 820 and utilizing any one of a number of well-known transfer protocols (e.g., HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources.

These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
receiving a request to render a stored image, the request comprising an output parameter indicative of a display constraint of a display device to be applied in the rendering of the stored image, the stored image having region characteristics associated therewith that indicate predetermined regions of interest in the stored image that are preserved during rendering of the stored image, the predetermined regions of interest including a core region of interest and a secondary region of interest that includes the core region of interest;

determining an adaptation process to apply to the stored image based on the output parameter received in the request, the determining of the adaptation process including:
based on the display constraint received in the request indicating an image output size for the display device is associated with a first threshold, scaling the stored image,
based on the display constraint received in the request indicating the image output size for the display device is associated with a second threshold, cropping the stored image to the core region of interest for display in an entire display area of the display device, and
based on the display constraint received in the request indicating the image output size is between the first threshold and the second threshold, cropping the stored image to the secondary region of interest;
rendering, using a processor of a machine, an output image based on the adaption process; and
providing the output image to the display device.

2. The method of claim 1, wherein the display constraint relates to at least one of the display device or a layout context within which the output image is to be rendered.

3. The method of claim 1, wherein the cropping to the secondary region of interest, comprises cropping to the secondary region of interest and scaling a result of the cropping.

4. The method of claim 1, wherein the cropping to the core region of interest comprises cropping to the core region of interest and scaling a result of the cropping.

5. The method of claim 1, further comprising automatically detecting the regions of interest associated with the stored image using an image recognition process.

6. The method of claim 1, further comprising mapping a size and location associated with each region of interest.

7. The method of claim 1, wherein the first predetermined threshold comprises a range that the image output size is between.

8. The method of claim 1, wherein the second predetermined threshold comprises a range that the image output size is between.

9. A system comprising:
a processor of a machine;
an image request module to receive a request for a stored image, the request comprising an output parameter indicative of a display constraint of a display device to be applied in rendering of the stored image, the stored image having region characteristics associated therewith that indicate predetermined regions of interest in the stored image that are preserved during rendering of the stored image, the predetermined regions of interest including a core region of interest and a secondary region of interest that includes the core region of interest;
an adaptation determination module to determine an adaptation process to apply to the stored image based on the output parameter received in the request, the adaptation process including:
based on the display constraint received in the request indicating an image output size for the display device is associated with a first threshold, scaling the stored image,
based on the display constraint received in the request indicating an image output size for the display device is associated with a second threshold, cropping the stored image to the core region of interest for display in an entire display area of the display device; and based on the display constraint received in the request indicating the image output size is between the first threshold and the second threshold, cropping the stored image to the secondary region of interest; and a rendering module to render, using the processor, an output image based on the adaption process the image request module further configured to provide the output image to the display device.

10. The system of claim 9, further comprising a region of interest module to automatically detect the regions of interest using an image recognition process.

11. The system of claim 10, wherein the adaptation determination module is further configured to scale the stored image that has been cropped to the core region of interest.

12. The system of claim 10, wherein the adaptation determination module is further to scale the stored image that has been cropped to the secondary region of interest.

13. The system of claim 10, wherein the first predetermined threshold and the second predetermined threshold comprise a range that the image output size is between.

14. A tangible machine-readable storage medium in communication with at least one processor, the machine-readable storage medium storing instructions which, when executed by the at least one processor, performs operations comprising:

receiving a request to render a stored image, the request comprising an output parameter indicative of a display constraint of a display device to be applied in the rendering of the stored image, the stored image having region characteristics associated therewith that indicate predetermined regions of interest in the stored image that are preserved during rendering of the stored image, the predetermined regions of interest including a core region of interest and a secondary region of interest that includes the core region of interest;

determining an adaptation process to apply to the stored image based on the output parameter received in the request, the determining of the adaption process including:

based on the display constraint received in the request indicating an image output size for the display device is associated with a first threshold, scaling the stored image, based on the display constraint received in the request indicating the image output size for the display device is associated with a second threshold, cropping the stored image to the core region of interest for display in an entire display area of the display device, and based on the display constraint received in the request indicating the image output size is between the first threshold and the second threshold, cropping the stored image to the secondary region of interest;

rendering an output image based on the adaption process; and providing the output image to the display device.

15. The tangible machine-readable storage medium of claim 14, wherein the determining of the adaptation process further comprises scaling the stored image that has been cropped to the core region of interest.

16. The tangible machine-readable storage medium of claim 14, wherein the determining the adaptation process further comprises scaling the stored image that has been cropped to the secondary region of interest.

17. The tangible machine-readable storage medium of claim 14, wherein the operations further comprise:

automatically detecting the regions of interest associated with the stored image using an image recognition process; and mapping a size and location associated with each region of interest.

18. The tangible machine-readable storage medium of claim 14, wherein the first predetermined comprises a range that the image output size is between.

19. The tangible machine-readable storage medium of claim 14, wherein the second predetermined threshold comprises a range that the image output size is between.

* * * * *